Figure 1:
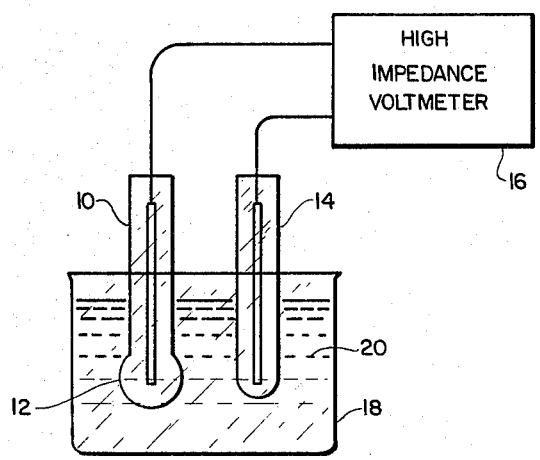

Oct. 11, 1966 A. L. BUDD 3,278,399
METHOD OF MEASURING SILVER ION CONCENTRATION
Filed Feb. 7, 1963

INVENTOR.
ALLAN L. BUDD
BY Thomas L. Peterson
ATTORNEY

United States Patent Office 3,278,399
Patented Oct. 11, 1966

3,278,399
METHOD OF MEASURING SILVER ION CONCENTRATION
Allan L. Budd, La Habra, Calif., assignor to Beckman Instruments, Inc., a corporation of California
Filed Feb. 7, 1963, Ser. No. 257,009
5 Claims. (Cl. 204—1)

This invention relates generally to a method of measuring the silver ion concentration in a liquid and, in particular, to a method of measuring silver ion concentration by means of a glass electrode.

The use of a glass electrode for the purpose of measuring the pH of a solution is well known. One of the problems encountered with the glass electrode in pH measurements is the sodium error. In recent years, glasses have been developed which are selective towards hydrogen ions and are not sensitive to sodium ions. Further development in glass electrodes has provided glass membranes which are more sensitive to sodium than potassium and vice versa. However, none of the glasses so far developed are suitable for measuring specifically the concentration of any metal ion in the presence of a large concentration of hydrogen ions in a solution. I have discovered, and to my knowledge it has not heretofore been known, that a glass electrode may be used to selectively measure the silver ion concentration of a solution.

Accordingly, the principal object of the present invention is to selectively measure the silver ion concentration in a liquid by using a glass electrode.

Another object of the invention is to provide a method for measuring the silver ion concentration in a solution by utilizing a glass electrode which, when no silver ions are present in the solution, is responsive to hydrogen, sodium or potassium ions; but, when silver ions are present in the solution, it is selectively sensitive to the silver ions.

According to a principal aspect of the present invention, I have discovered that the silver ion concentration in a solution can be determined by using a glass electrode together with a standard reference electrode, with the electrodes being connected together with a conventional high impedance voltmeter. More specifically, I have found that glass electrodes having a membrane of essentially an alkali-alumina-silica glass are capable of measuring the silver ion concentration in a solution. Such measurements may be made without first raising the pH of a solution provided that the hydrogen ion concentration is not greater than the silver ion concentration. Since glass electrodes have certain properties which are of great advantage over other means for measuring silver ion concentration, such as low maintenance and constant and repeatable response, it is apparent that this invention will have many applications in both process and laboratory instrumentation.

Figure 2:
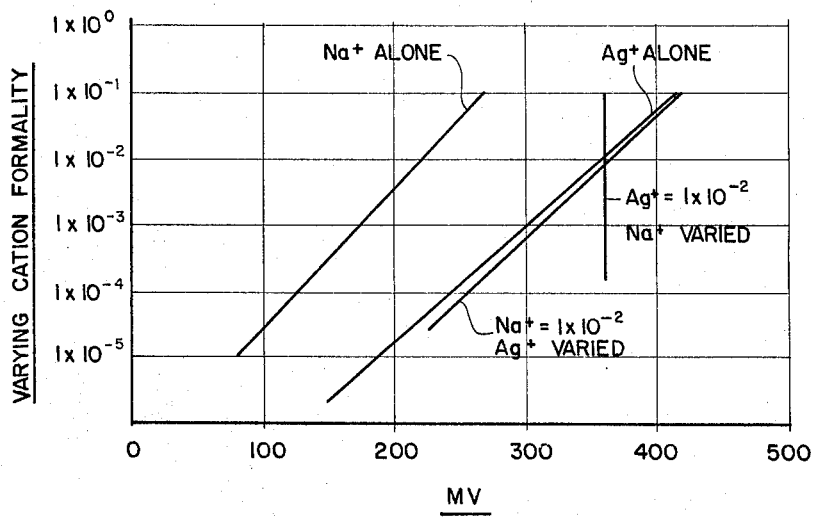

These and other objects, aspects and advantages will become apparent from the following description taken in connection with the accompanying drawing wherein:

FIGURE 1 is a diagrammatic view of conventional pH equipment employing a glass electrode made of glass which is sensitive to silver ions in the sample solution; and FIGURE 2 is a graph showing data for actual millivolt response of one of the glasses of the present invention in the presence of four aqueous solutions over the range of $1-10^{-4}$ F, F indicating the formality of the solutions, i.e., the number of formula weights of the substances per liter of solution.

The method of the present invention may be practiced by utilizing the arrangement illustrated in FIG. 1 of the drawing. In this arrangement, there is provided a conventional glass electrode 10 having a bulb or membrane 12, the composition of which will be described later. The glass electrode is operatively connected to a reference half-cell 14, by conventional amplification equipment 16 such as a high impedance voltmeter, as well known in the art. The two electrodes 10 and 14 are placed in a beaker 18 containing a sample solution 20 having unknown silver ion concentration.

I have discovered that a glass electrode having an alkali-alumina-silica glass membrane sensitive to hydrogen, sodium and/or potassium ions in a solution may also be sensitive to silver ions in spite of the presence of the hydrogen, sodium and/or potassium ions. Given by way of example, but not by limitation, are two examples of suitable glass compositions which will provide the unexpected result of measuring the silver ion concentration in a solution, the examples being expressed as a prefusion composition and the proportions being given in parts by weight: silica sand 11.4, lithium carbonate 6.0, and aluminum hydrate 7.8 (hereinafter referred to as glass No. 1) and silica sand 12.45, sodium carbonate 8.55 and aluminum nitrate 9.0 (hereinafter referred to as glass No. 2). Glass No. 1 is described in detail in copending patent application Serial No. 62,484, filed October 13, 1960, entitled "Cation Sensitive Glass Electrode," assigned to the same assignee as the present invention. The mixtures described above may be melted in a platinum-lined Alundum crucible and may be refined bubble-free at moderate conventional temperatures in the order of 1400° C., such method being well known to one skilled in the art.

Glass electrodes having membranes formed of the above-described compositions were tested in an apparatus similar to that shown in FIG. 1 of the drawing. A reference half-cell having a silver-silver chloride electrode and a fiber junction was used. The reference half-cell was connected to the sample solution by a slow leaking 10% potassium nitrate salt bridge (not shown) to prevent interference from any chloride ions in the solution. The test solutions were prepared from analytical reagent grade chemicals and distilled water by diluting aliquots standard 1.000F solutions in the appropriate volume of water. The sensitivity of a glass electrode provided with a membrane of glass composition No. 1 described above is shown in the graph in FIG. 2. The graph shows the actual millivolt response of the lithia-alumina-silica glass for a four decade range of silver and sodium ion concentration. The data is plotted in four different ways; (1) as sodium response without the presence of silver ions, (2) as silver response without the presence of sodium ions, (3) as sodium response in the presence of $1 \times 10^{-2}$F silver ion solution, and (4) as silver response in the presence of $1 \times 10^{-2}$F sodium ion solution. The pH of each of these solutions was about seven or less. It can be seen that glass No. 1 is much more sensitive to silver ions than to the sodium ions, when each are present alone in the sample solution. Also, it is seen that the response of the electrode to silver ions is virtually unaffected by a changing concentration of sodium ions. Still further, glass No. 1 yields a change of about 55 millivolts per decade of silver ion concentration over a range of more than four decades. Similar tests were run on glass No. 2, the results of the tests showing that that glass is also sensitive to silver ions, however, it is not as selective as is glass No. 1 to only silver ions. An important characteristic of the glasses is that they respond in a Nernstian manner to changes in silver concentration in the presence of all other ions.

Tests were also run on glasses Nos. 1 and 2 in the presence of potassium and hydrogen ions. In each case, it was found that the glasses were sensitive to the potassium or hydrogen ions in a test solution not having silver ions; but, on the other hand, were sensitive to silver ions in the presence of potassium or hydrogen ions. Again, glass No. 1 was more selective to the silver ions than glass No. 2. Expressed in other words, hydrogen, sodium or potassium ions seem to have less effect on the silver ion response of the glass electrodes of this invention than the silver ions have on the hydrogen, sodium or potassium response.

The data obtained from my tests may be expressed in the terms of the selectivity ratio K which is defined in Patent No. 2,829,090 to Eisenman et al. as:

$$E = E^0 \, RT/F \, \ln(A^+ + KB^+)$$

where $A^+$ and $B^+$ indicate the two ions whose sensitivity are being compared. It should be kept in mind that for an equal response or sensitivity K will be equal to one. Table I below gives the tabulations of K, whose magnitude indicates the sensitivity of the glasses to silver ions relative to sodium, potassium and hydrogen ions.

TABLE I

| $Ag^+$ | Glass No. 1 | Glass No. 2 |
|---|---|---|
| $Na^+$ | 150 | 18.5 |
| $K^+$ | 1,000 | 18.5 |
| $H^+$ | 25 | 0.7 |

This table shows that the two glass compositions described herein, and especially glass No. 1, are highly selective for silver ions in the presence of the other ions.

Although only two glass compositions have been described herein for purposes of illustration of this invention, based upon my discovery I expect that the silver ion concentration of a solution can be measured by any glass electrode which responds to sodium and/or potassium ions and, most likely will be more responsive to the silver than the other ions. This I expect from considering the factors which are believed to influence the response of the glass for a given ion which are:

(1) The size of the ion relative to the size of the "electron rich holes" in the glass membrane.
(2) The Lewis acidity of the ion.
(3) The polarizability of the ion.
(4) The energy of electron transfer (which is proportional to the $E_o$ of the ion-metal equilibrium).
(5) The relative population of the ions, i.e., concentration.

Conductance data shows that the size of the silver ion is in the same range as sodium and potassium ions. The available sites for covalent bonding make silver a better Lewis acid than sodium or potassium. Also, silver is more polarizable than either sodium or potassium and has an $E_o$ of $-0.7991$ vs. N.H.E., whereas sodium and potassium are high on the positive side. All these factors tend to favor the responsiveness of glass electrodes to silver ions over sodium and potassium ions. Therefore, it follows that an electrode which responds to sodium and/or potassium ions should also respond to silver ions and in fact be more responsive to silver ions than the other two.

Thus, I have discovered that sodium and/or potassium responsive glass electrodes are also responsive to silver ions. And, even more important, they are more responsive to silver ions than the other ions and in some cases even selectively responsive to the silver ions. The glasses are of particular advantage because they respond in a Nernstian manner to changes in silver ion concentrations in the presence of all the other ions. Since glass electrodes possess the advantage of having low maintenance and constant and repeatable response, the method of the present invention provides an economical and time saving technique for measuring silver ion concentrations.

Although several embodiments of the invention have been disclosed herein for purposes of illustration, it will be understood that variations and modifications of the specific figures disclosed and discussed herein may be made without necessarily departing from the spirit of the invention, the scope of which is defined by the following claims.

What is claimed is:

1. A method of selectively measuring silver ion concentration in a liquid including sodium and potassium ions, comprising the steps of:
   contacting the liquid with the external surface of a silver ion sensitive membrane of a glass electrode which membrane is essentially an alkali-alumina-silica glass;
   contacting the liquid with a reference half-cell; and
   determining the potential developed between the glass electrode and the reference half-cell as a measure of the silver ion concentration in the liquid.

2. A method of selectively measuring silver ion concentration in a liquid including hydrogen, sodium and potassium ions, comprising the steps of:
   contacting the liquid with the external surface of a silver ion sensitive membrane of a glass electrode which membrane is essentially a lithia-alumina-silica glass;
   contacting the liquid with a reference half-cell; and
   determining the potential developed between the glass electrode and the reference half-cell as a measure of the silver ion concentration in the liquid.

3. A method as set forth in claim 2 wherein said glass membrane is made from a prefusion mixture consisting essentially, in parts by weight, of silica about 11.4, lithium carbonate about 6.0, and aluminum hydrate about 7.8.

4. A method of selectively measuring silver ion concentration in a liquid including sodium and potassium ions, comprising the steps of:
   contacting the liquid with the external surface of a silver ion sensitive membrane of a glass electrode which membrane is essentially a soda-alumina-silica glass;
   contacting the liquid with a reference half-cell; and
   determining the potential developed between the glass electrode and the reference half-cell as a measure of the silver ion concentration in the liquid.

5. A method as set forth in claim 4 wherein said glass membrane is made from a prefusion mixture consisting essentially, in parts by weight, of silica about 12.5, sodium carbonate about 8.5, and aluminum nitrate about 9.0.

References Cited by the Examiner

UNITED STATES PATENTS

| 2,829,090 | 4/1958 | Eisenman et al. | 204—1.1 |
| 3,041,252 | 6/1962 | Eisenman et al. | 204—1.1 |
| 3,143,488 | 8/1964 | Arthur et al. | 204—195.1 |

OTHER REFERENCES

Mattock et al.: "Analyst," December 1962, vol. 87, No. 1041, pp. 977 and 978, QD71A45.

Z. Physik: Chem. Abs. A 156, pp. 232–236 (1931).

Bureau of Standards Journal of Research, vol. 9 (1932), pp. 833–853.

Ives et al.: "Reference Electrode," 1961, pp. 553 and 554.

JOHN H. MACK, *Primary Examiner.*

MURRAY TILLMAN, T. TUNG, *Assistant Examiners.*

Disclaimer 3,278,399.—*Allan L. Budd*, La Habra, Calif. METHOD OF MEASURING SILVER ION CONCENTRATION. Patent dated Oct. 11, 1966. Disclaimer filed Aug. 20, 1968, by the assignee, *Beckman Instruments, Inc.*
Hereby enters this disclaimer to claims 1, 4 and 5 of said patent.
[*Official Gazette January 7, 1969.*]